Nov. 18, 1958 J. W. BRISON 2,861,136

SWITCH MECHANISM FOR TELEPHONE APPARATUS

Filed June 5, 1956 2 Sheets-Sheet 1

INVENTOR
J. W. BRISON
BY John C. Morris
ATTORNEY

SWITCH MECHANISM FOR TELEPHONE APPARATUS

Filed June 5, 1956 2 Sheets-Sheet 2

INVENTOR
J. W. BRISON
BY John C. Morris
ATTORNEY 2,861,136
Patented Nov. 18, 1958

2,861,136

SWITCH MECHANISM FOR TELEPHONE APPARATUS

Jordan W. Brison, South Park, Charleston, W. Va., assignor to American Telephone and Telegraph Company, a corporation of New York Application June 5, 1956, Serial No. 589,489

10 Claims. (Cl. 179—164)

This invention relates to telephone sets, such as subscribers' station sets, and more particularly to switching means for use in subscriber sets.

In the operation of party line telephones a party loop is sometimes disabled by a receiver being left "off hook" at one subscriber's station, thereby giving at the central office a "busy" signal for that line. Lifting of other receivers in this line is, therefore, of no additional effect, and the remaining subscribers are deprived of the use of the line.

The terms "switchhook," "on hook," and "off hook," common in the telephone industry but which do not always literally apply to modern telephone instruments, have been used herein to designate a like means or condition in such sets. The mechanical connection between the handset or receiver and the usual telephone switches is called a "switchhook." When the handset is in its cradle, it is "on hook"; and when it is lifted, it is "off hook."

An object of this invention is to facilitate the "clearing" of a party line, one telephone set of which has been left in the off-hook condition.

Under the noted conditions it is possible to send a signal from the central office to vibrate the bell clapper. The party line may be cleared by taking advantage of this situation. A feature, therefore, of this invention resides in switching means operable by the signal bell mechanism of a telephone subscriber's set when the set is in the off-hook condition. The noted switching means is connected so as to open the primary circuit, thereby clearing the busy signal at the central office.

A further feature of this invention lies in connecting means between the switchhook mechanism and the switching means whereby said switching means is conditioned for operation only when the receiver means is off hook.

Another feature involves arrangement of the switching control means so that the switching means, if it has been operated, is reset upon restoration of the receiver to the on-hook condition.

Figure 1:
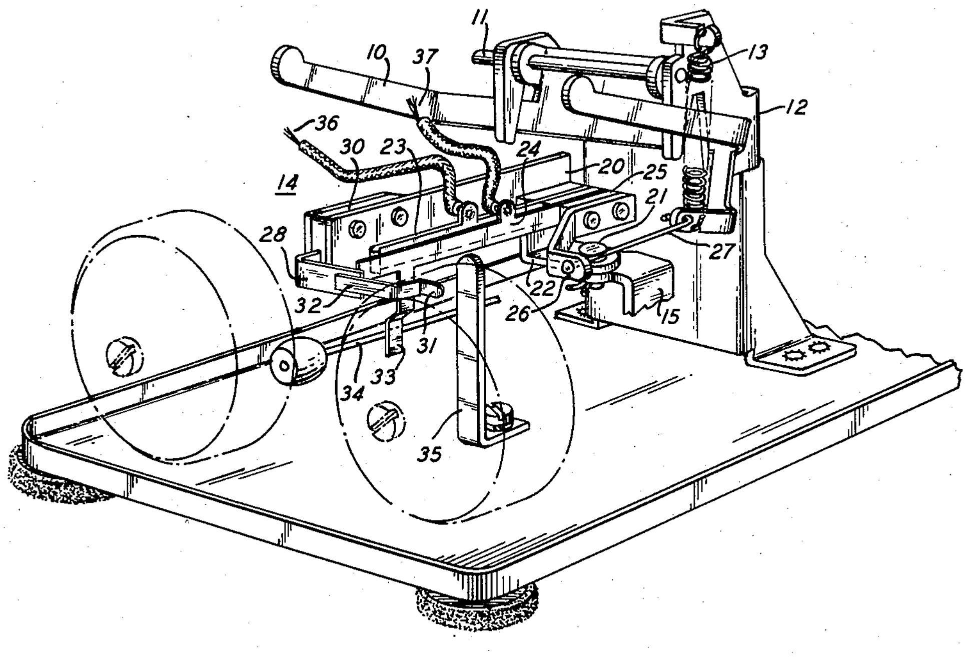
Figure 2:
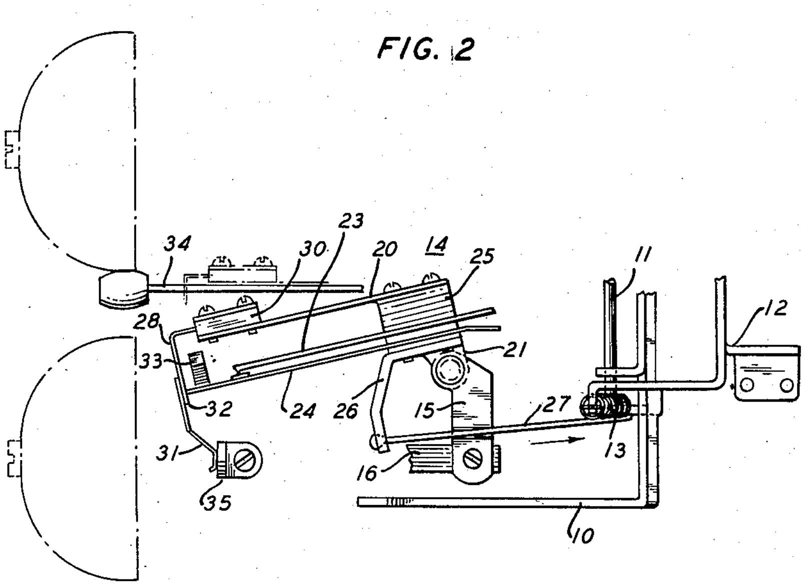
Figure 3:
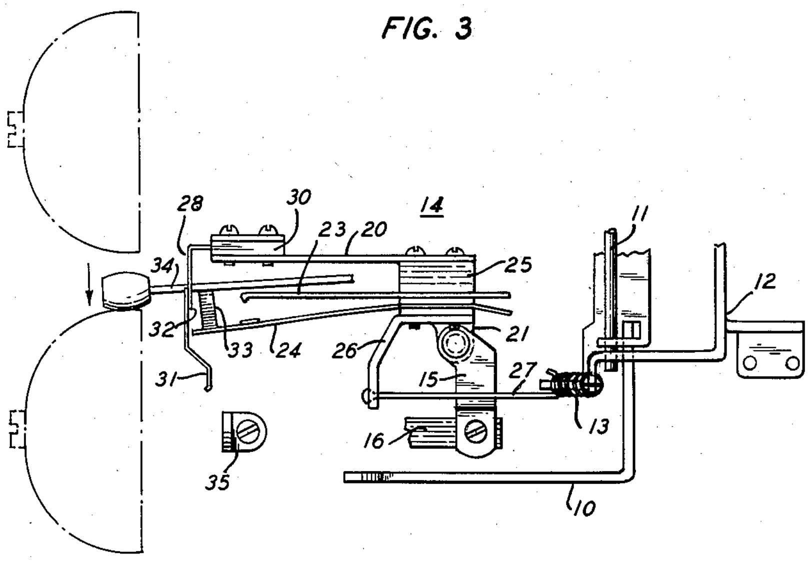

Other and further objects and features of this invention will appear more fully and clearly from the following description of an illustrative embodiment thereof, taken in conjunction with the appended drawing, in which:

Fig. 1 is a perspective view of a portion of a telephone set illustrating one specific embodiment of this invention; and Figs. 2 and 3 are top plan views of portions of the mechanism of Fig. 1 illustrating different phases of operation.

Turning now to the drawing, in the specific embodiment depicted the switchhook 10 is mounted for limited rotation around the axle 11 horizontally journaled in a standard 12. In Fig. 1 the switchhook is shown in the offhook condition, biased upwardly by the spring 13.

The switch of this invention and its accompanying operating mechanism, generally designated as 14, is vertically pivoted to a bracket 15, a portion only of which is shown in Fig. 1. The bracket 15 may be mounted on a portion 16 of the magnet structure of the bell operating mechanism. (See Figs. 2 and 3.)

The mechanism 14 includes a support or arm 20 pivoted to the bracket 15 by a bolt or pin 21 passing through the ear 22 which projects horizontally from the arm. Contact springs 23 and 24 are secured to the arm 20 adjacent the pivot 21 by a clamping assembly 25 having suitable insulating inserts for isolating the springs electrically from the arm 20 and from each other.

The clamping assembly 25 includes a projecting element 26 connected by means of a link 27 to the switchhook 10 at the point of attachment of its biasing spring 13.

The contact spring 24 extends beyond its cooperating spring 23 so that its end rests against a latching member 28 secured to and insulated from the support arm 20 by the means 30.

The latching member 28 is, due to its resilience and position, biased toward the contact spring 24 and has an offset end portion 31 and an intermediate shoulder portion 32 for purposes to be described. The contact spring 24 also has a projection 33 extending into the path of the bell clapper rod 34 under certain conditions.

An unlatching mechanism comprises a member 35 secured to a fixed part of the telephone set and located in the path of offset portion 31 of the latch 28 when the arm 20 is moved in a manner to be described. The contact springs are connected into a telephone circuit by the conductors 36 and 37.

As has been indicated, the mechanism is shown in Fig. 1 with the receiver off hook. In this condition the spring 13, besides biasing the switchhook upwardly, pivots or deflects the mechanism 14 to a position such that the projection 33 is close enough to the bell clapper rod 34 to be within its arc of operation. The springs 23 and 24 are in contact at this time, closing the circuit between the conductors 36 and 37.

With the telephone set thus conditioned, it is possible to open the circuit at 23—24 by means of a signal over the line. The bell clapper is vibrated by the signal, and its rod 34 strikes the projection 33 of the contact spring 24, moving the spring to a position beyond the shoulder 32 of the latch 28, as shown in Fig. 3. Separation of the contact springs 23 and 24 opens a suitable portion of the telephone circuit and removes the busy signal for that line in the central office. The shoulder 32 catches the deflected spring 24 after the clapper rod stops vibrating and holds the contacts open.

When the receiver is replaced, restoring the on-hook condition, the mechanism 14 is pivoted to the undeflected position shown in Fig. 2. The offset portion 31 of the latch 28 engages the member 35 and is moved thereby sufficiently to allow the spring 24 to pass over the shoulder 32 and return to its normal position in contact with the spring 23. Moreover, the projection 33 is now beyond the operating arc of the bell clapper rod 34. Thus, normal ringing of the bell during this condition has no effect on the means 14.

It is to be understood that the above-described arrangements are illustrative of the application of the principles of the invention. Numerous other arrangements may be devised by those skilled in the art without departing from the spirit and scope of the invention.

What is claimed is:

1. In a telephone set having a switch operating mechanism controlled by removal from and replacement of the handset on its cradle and a ringer including a vibratile bell clapper; a normally closed auxiliary switch mounted on a deflectable arm in proximity to said mechanism and said clapper, auxiliary switch opening means connected to the auxiliary switch for operation by the bell clapper when said clapper is vibrating, latch means for retaining the switch in open position, a linkage connecting the deflectable arm to said switch operating mechanism to deflect the arm to a position such that the switch opening means is in the path of the bell clapper when the handset is removed from its cradle and to return said arm to an undeflected position such that said switch opening means is out of said path when the handset is on its cradle, and means for disabling the latch means when the arm is in its undeflected position.

2. An auxiliary switch for a telephone set having a switchhook and a vibratile bell operating means; said switch comprising a pivoted support, means connected to the switchhook for moving said support about its pivot to alternative positions, closed contacts on said support, means connected to a contact and operable by the vibratile means when the support is in one position for opening said contacts, latching means for keeping the contacts open, and means operable when the support is in the other position for disabling the latching means to allow the contacts to close.

3. An auxiliary switch for a telephone set having a switchhook and a vibratile bell operating means; said switch comprising a pivoted support, means connected to the switchhook for moving said support about its pivot to alternative positions upon switchhook movement, closed contacts on said support, means connected to a contact and in the path of the vibratile means when the support is in one position for opening said contacts, latching means for keeping the contacts open, and means operable when the support is in the other position for disabling the latching means to allow the contacts to close.

4. An auxiliary switch for a telephone set having a switchhook and a vibratile bell operating means; said switch comprising a pivoted support, means connected to the switchhook for moving said support about its pivot to alternative positions, closed contacts on said support, switch operating means connected to a contact and operable by the vibratile means when the support is in one position for opening said contacts, latching means for keeping the contacts open, and means operable when the support is in the other position for disabling the latching means to allow the contacts to close, said switch operating means being inoperable by the vibratile means when the support is in said other position.

5. Means for opening an operating circuit of a telephone set in response to a central office signal when the telephone set is in the receiver off-hook condition, said set having a receiver, a switchhook and a vibratile signal operator, said means comprising a deflectable arm mounted adjacent the switchhook, a normally closed switch on said arm and connected in the operating circuit, means connected to the switchook for deflecting said arm when the receiver is off hook, switch opening means connected to the switch and oriented for interposition into the path of the vibratile operator, and latching means for maintaining the switch open, both the opening means and the latching means being operative when the arm is deflected, and means for disabling the latching means when the arm is returned to the undeflected position.

6. Means for opening an operating circuit of a telephone set in response to a central office signal when the telephone set is in the receiver off-hook condition, said set having a receiver, a switchhook and a vibratile signal operator responsive to a central office signal, said means comprising a deflectable arm mounted adjacent the switchhook, a normally closed operating circuit switch on said arm, means connected to the switchhook for deflecting said arm when the receiver is off hook; switch opening means connected to the switch and oriented for interposition into the path of the vibratile operator, and latching means for maintaining the switch open, both the operating means and the latching means being operative when the arm is deflected; and means for disabling the latching means when the arm is returned to the undeflected position.

7. In a telephone set having a switchhook and a bell clapper rod, an auxiliary switching means comprising a pivoted support connected to the switchhook for deflection thereby to alternative positions, normally closed contacts on the support, means operable by the bell clapper rod when the support is in one position to open the contacts, latching means on the support for holding the contacts open, and means on the set for releasing the latching means and allowing the contacts to reclose when the support is moved to the other position.

8. In a telephone set having a switchhook operable to alternative positions as a function of normal use of the set and having a vibratile bell clapper rod; a normally closed auxiliary switch, means for moving said switch comprising a deflectable arm supporting the switch, means connected to the switchhook for deflecting said arm to positions corresponding to the alternative positions of the switchhook, and means connected to the switch for opening the switch when the bell clapper rod is vibrated while the switch supporting arm is in one position and for allowing closing of the switch when said arm is in its alternative position.

9. In a telephone set having a switchhook operable to alternative positions as a function of normal use of the set and having a vibratile bell clapper rod; an auxiliary switch that remains closed during normal operation of the set, means for moving said switch comprising a pivoted arm supporting the switch, means connected to the switchhook for pivoting said arm to positions corresponding to said alternative positions, and means connected to the switch for opening the switch when the bell clapper rod is vibrated while the switch supporting arm is in one position and for allowing closing of the switch when said arm is in its alternative position.

10. In a telephone set having a switch operating mechanism controlled by removal from and replacement of the receiver on its support and a calling signal means including a vibratile member; a normally closed auxiliary switch mounted in proximity to said mechanism and said vibratile member, auxiliary switch operating means movable to alternate positions by said switch operating mechanism and operable in one of said positions to open the auxiliary switch upon vibration of said vibratile member, and latching means for maintaining the auxiliary switch operating means in the auxiliary switch open condition until said auxiliary switch operating means is moved to the other of said alternate positions by said switch operating mechanism.

References Cited in the file of this patent

UNITED STATES PATENTS

| | | |
|---|---|---|
| 835,181 | Davidson | Nov. 6, 1906 |
| 1,145,632 | Ude | July 6, 1915 |
| 1,350,737 | Riess | Aug. 24, 1920 |